(12) United States Patent
Voltz (10) Patent No.: US 6,765,624 B1
(45) Date of Patent: *Jul. 20, 2004

(54) SIMULATED BURST GATE SIGNAL AND VIDEO SYNCHRONIZATION KEY FOR USE IN VIDEO DECODING

(75) Inventor: Christopher D. Voltz, Houston, TX (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 849 days.

(21) Appl. No.: 08/831,731

(22) Filed: Apr. 1, 1997

(51) Int. Cl.[7] .............................. H04N 9/77; H04N 9/45; H04N 9/475; H04N 9/455

(52) U.S. Cl. ....................... 348/663; 348/506; 348/524; 348/540; 348/549; 348/667

(58) Field of Search ................................ 348/505, 506, 348/510, 512, 536, 544, 549, 540, 530, 524, 663, 665, 667; H04N 9/45, 9/75, 9/455, 9/475

(56) References Cited

U.S. PATENT DOCUMENTS

| | | | | |
|---|---|---|---|---|
| 3,716,795 A | * | 2/1973 | Brown | 327/115 |
| 4,149,180 A | * | 4/1979 | Lovely | 348/506 |
| 4,169,659 A | * | 10/1979 | Marlowe | 348/524 |
| 4,228,456 A | * | 10/1980 | Lovely | 348/506 |
| 4,291,336 A | * | 9/1981 | Shanley, II | 348/506 |
| 4,292,648 A | * | 9/1981 | Kowal | 386/10 |

(List continued on next page.)

OTHER PUBLICATIONS

K.B. Benson, Television Engineering Handbook, McGraw–Hill Book Company, p. 13.141, 1986.*
Jack, Keith, "Video Demystified," Chapter 6, NTSC/PAL Digital Decoding, 1996, pp. 259–270, and Appendix A, pp. A–6 through A–9.
Rogers, Greg, "Guide to Comb Filters: Y/C Separation", The Internet Journal of Home Theater.
Rogers, Gret, "Y/C & Composite Video Signal Formats", The Internet Journal of Home Theatre.
MC44144 Motorola Semiconductor Technical Data, Advance Information, Subcarrier Phase–Locked Loop.
MC141622 Motorola Semiconductor Technical Data, Advance Information Advanced Comb Filter–II (AFC–II) (2/95).
SAA7111 Video Input Processor (VIP) Data Sheet, Philips Semiconductors (May 15, 1996).

*Primary Examiner*—John Miller
*Assistant Examiner*—Brian P. Yenke (57) ABSTRACT

A simulated burst gate signal and a video synchronization key are generated. A video decoder generates a horizontal sync pulse which is programmed to envelop a color burst, thereby simulating a burst gate signal. The offset to the horizontal sync pulse due to simulating a burst gate signal may be compensated at a video memory subsystem receiving the horizontal sync signal, in order to determine when active pixels are provided by the video decoder. Alternatively, counter circuitry external to the video decoder may be used to generate a simulated burst gate signal by counting the number of pixel clock cycles between the horizontal sync pulse and the color burst. Unlike a burst gate signal generated within a video decoder for use with color separation circuitry in the video decoder, a simulated burst gate signal allows for use of color separation circuitry external to the video decoder. Detecting a color burst using external color separation circuitry is thus also disclosed. The programmable horizontal sync pulse of a video decoder is capable of being programmed and later compensated. The programmable horizontal sync pulse thus may also be used as a synchronization key for video devices.

24 Claims, 11 Drawing Sheets

U.S. PATENT DOCUMENTS

| | | | |
|---|---|---|---|
| 4,422,103 A | * 12/1983 | Kanamaru | 386/16 |
| 4,620,219 A | * 10/1986 | Burrowes | 348/506 |
| 4,638,360 A | * 1/1987 | Christopher et al. | 348/537 |
| 4,688,081 A | * 8/1987 | Furuhata et al. | 348/498 |
| 4,843,470 A | * 6/1989 | Wook et al. | 348/525 |
| 4,864,399 A | * 9/1989 | Romesburg et al. | 348/537 |
| 4,992,874 A | * 2/1991 | Willis et al. | 348/565 |
| 5,231,509 A | * 7/1993 | Kinugasa et al. | 386/16 |
| 5,396,296 A | * 3/1995 | Gallagher | 348/565 |
| 5,712,688 A | * 1/1998 | Eglit | 348/510 |

\* cited by examiner

SIMULATED BURST GATE SIGNAL AND VIDEO SYNCHRONIZATION KEY FOR USE IN VIDEO DECODING

BACKGROUND OF THE INVENTION

1. Field of the Invention

The present invention relates to video technology using composite video signals.

2. Description of the Related Art

Almost all contemporary video equipment utilize composite video inputs or outputs. Laser discs, cable TV, and broadcast TV are sources of composite video that generate composite video outputs. Video devices such as VCRs, laser disc players, camcorders, and TV monitors receive and convert composite video in recording or playing video data, thereby processing composite video inputs. A composite video signal is an encoded signal that includes a luminance signal, Y, and a chrominance signal, C. When a video signal is separated into both a luminance signal and a chrominance signal, the signals are termed Y/C video. The luminance or brightness signal represents the black and white information of a video signal, and a chrominance signal represents the color information of a video signal. A composite video signal is specifically a summation of the luminance signal and the chrominance signal. A composite video signal permits the chrominance signal and the luminance signal to share bandwidth such that the signals overlap in a portion of the same frequency range, minimizing the bandwidth of the composite video signal. In addition to black and white information provided by a luminance signal, a luminance signal includes a horizontal sync pulse and a vertical sync pulse. The composite video signal includes a color subcarrier burst which is sent with each horizontal sync pulse. The color subcarrier burst serves as the reference point for the chrominance signal.

The luminance and chrominance signals of a composite video signal occupy the same frequency space by the process of frequency interleaving. The energy spectrum of a static composite video signal is concentrated in clusters separated by the horizontal scan rate. The luminance signal does not have a continuous distribution of energy across its 4.2 MHz bandwidth. Instead, the luminance signal exists as clusters of energy, each separated by 15.734 kHz. The chrominance signal is contained in clusters spaced at 15.734 kHz intervals across a bandwidth from about 2.1 MHz to 4.2 MHz. By providing the color subcarrier at an odd harmonic (455) of the horizontal scanning frequency divided by 2, the chrominance signal clusters are centered exactly between the luminance signal clusters. As a result, the luminance and chrominance signals are frequency interleaved. Y/C separation of a composite video signal is achieved using a filter such as a digital comb filter. A comb filter separates the luminance and the chrominance signal by generating a frequency response that selectively passes either the luminance signal or the chrominance signal.

Y/C separation involves certain artifacts. The cross-luminance artifact is composed of alternate light and dark patterns which are present on the vertical edges of transition regions between sharp changes in color on a screen. The cross-chrominance artifact is in the form of high frequency luminance information that generates colored "rainbow" regions on a screen rather than black and white regions. These artifacts thus detrimentally affect video quality and are a function of any inaccuracies in Y/C separation.

A video decoder, which serves to decode an analog composite video signal into digital form, may include a comb filter and color separation circuitry for generating a burst gate signal to detect a color burst. A color burst takes the form of a number of cycles of the color subcarrier. A burst gate signal is required to lock onto the color burst. Detection of a color burst is necessary for identifying the timing location of the color information in a composite video signal. In high quality video applications, the inaccuracies of color separation circuitry internal to a video decoder have provided unacceptable levels of cross-luminance and cross-chrominance. Because an internal burst gate signal has been required to lock onto a color burst, additional color separation circuitry external to the decoder to improve video quality has not been an option. Because a composite video signal is in analog form, externally generating a burst gate signal from the composite video signal is a prohibitive undertaking in terms of technical complexity and cost.

SUMMARY OF THE INVENTION

Briefly, the present invention generates a simulated burst gate signal and a video synchronization key. A video decoder generates a horizontal sync pulse which is programmed to envelop a color burst, thereby simulating a burst gate signal. The offset to the horizontal sync pulse due to simulating a burst gate signal may be compensated at a video memory subsystem receiving the horizontal sync signal in order to maintain an accurate determination of when active pixels are provided by the video decoder. Alternatively, counter circuitry external to the video decoder may be used to generate a simulated burst gate signal by counting the number of pixel clock cycles between the horizontal sync pulse and the color burst. Unlike a burst gate signal generated within a video decoder for use with color separation circuitry in the video decoder, a simulated burst gate signal allows for use of color separation circuitry external to the video decoder. Detecting a color burst using external color separation circuitry is thus also disclosed. Further, since the programmable horizontal sync pulse of a video decoder is capable of being programmed and later compensated, the horizontal sync pulse may also be used as a synchronization key for video devices.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1A:
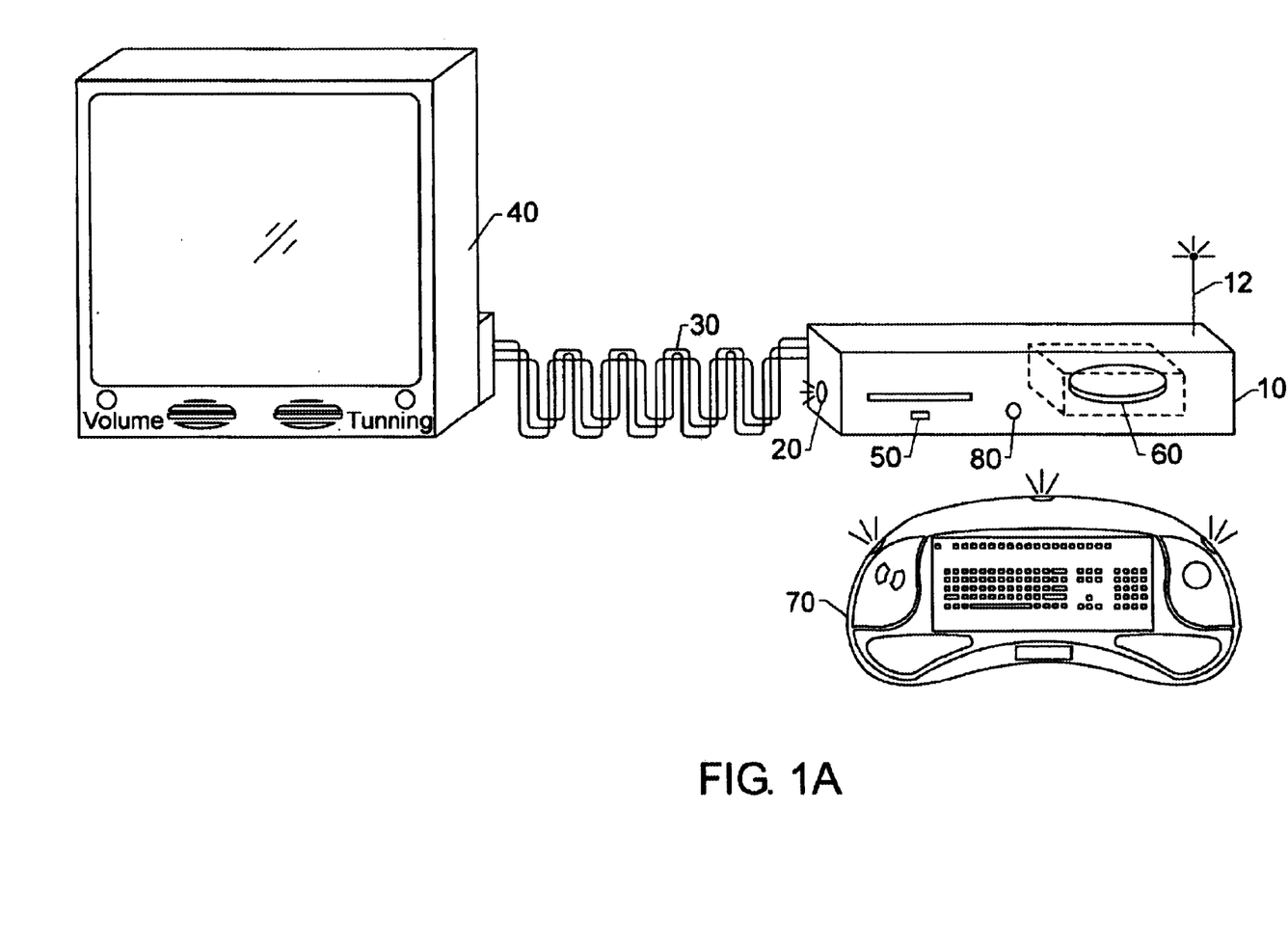
FIG. 1A is a perspective view of the home theater system in accordance with the present invention.

Turning now to FIG. 1A, a home theater computer system is shown. The home theater computer system of FIG. 1A provides computing capability as well as audiovisual theatrical projection capabilities. The home theater computer system of FIG. 1A revolves around a computer base unit which is multimedia-capable. Multimedia refers to the integration of text, audio, graphics, still image, and moving pictures into a single computer-controlled product. It includes the combination of computers, video or compact disc players, video monitors, optical scanners, audio cards, music synthesizers, etc., all linked together by system software.

In the home theater computer system of FIG. 1A, the normal computer display which is optimized for viewing at 15–18 inches from the user's eyes is replaced with a high resolution display unit 40, which is preferably a VGA compatible display with resolutions of 640×480 pixels. The display unit 40 is driven by the computer base unit 10 via a cable 30. The display unit 40 is capable of acting as either a computer monitor in one mode of the system or as a television unit in a second mode. When receiving TV transmission, the computer base unit 10 has an antenna or tuner 12 for receiving TV signals over the air waves.

The computer base unit 10 of FIG. 1A also contains a compact disk read only memory (CD-ROM) drive 60, a floppy drive 50, and a plurality of communications ports 20 and 80, preferably radio-frequency or infrared data ports. The communication ports 20 and 80 communicate with a keyboard 70. In addition, the computer housing 10 has an antenna or tuner 12 for receiving television transmissions. With respect to the keyboard 70, the keyboard transmits serial information over one or more infrared connections thereby achieving wireless portability.

Figure 1B:
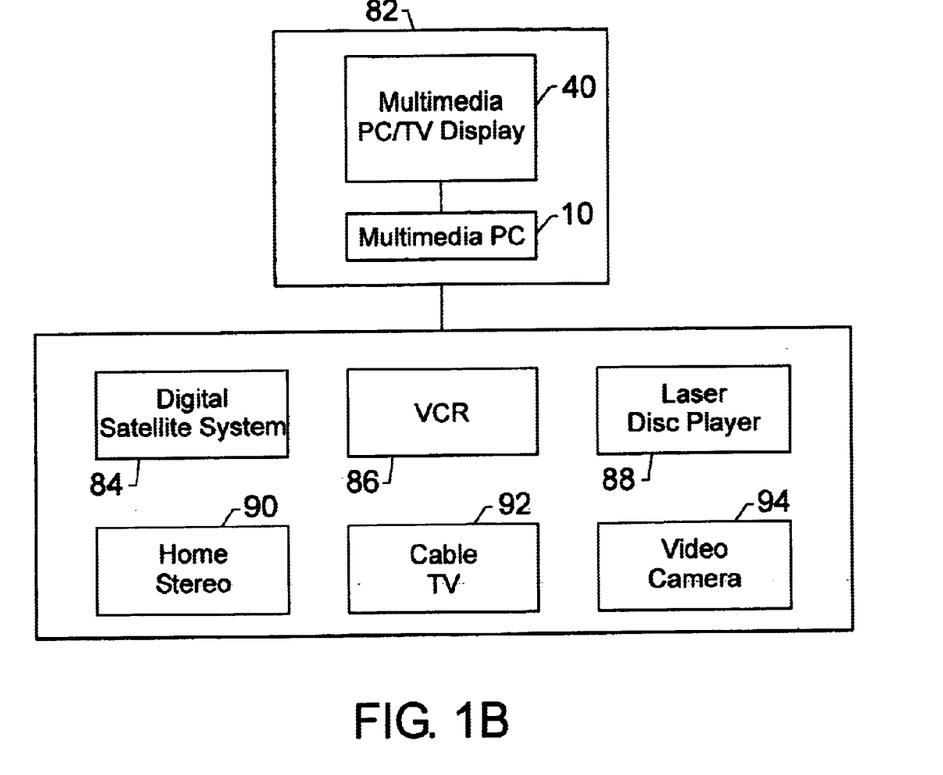
FIG. 1B is a block diagram of a home theater system.

Turning to FIG. 1B, a block diagram of the home theater system of the present invention is shown. The PC theater 82 of the home theater system includes a multimedia PC/TV display 40 and a multimedia PC 10. The multimedia big screen display or monitor 40 displays a digitally enhanced picture. The PC theater 82 provides at least a PC mode and a TV mode. In the PC mode, the multimedia PC 10 provides the necessary hardware. The PC theater 82 can be connected to a variety of multimedia equipment, such as a digital satellite system 84, a VCR 86, a laser disc player 88, a home stereo 90, cable TV 92 or a video camera 94. In this way, the home theater system provides and integrates various multimedia functions.

Figure 2:
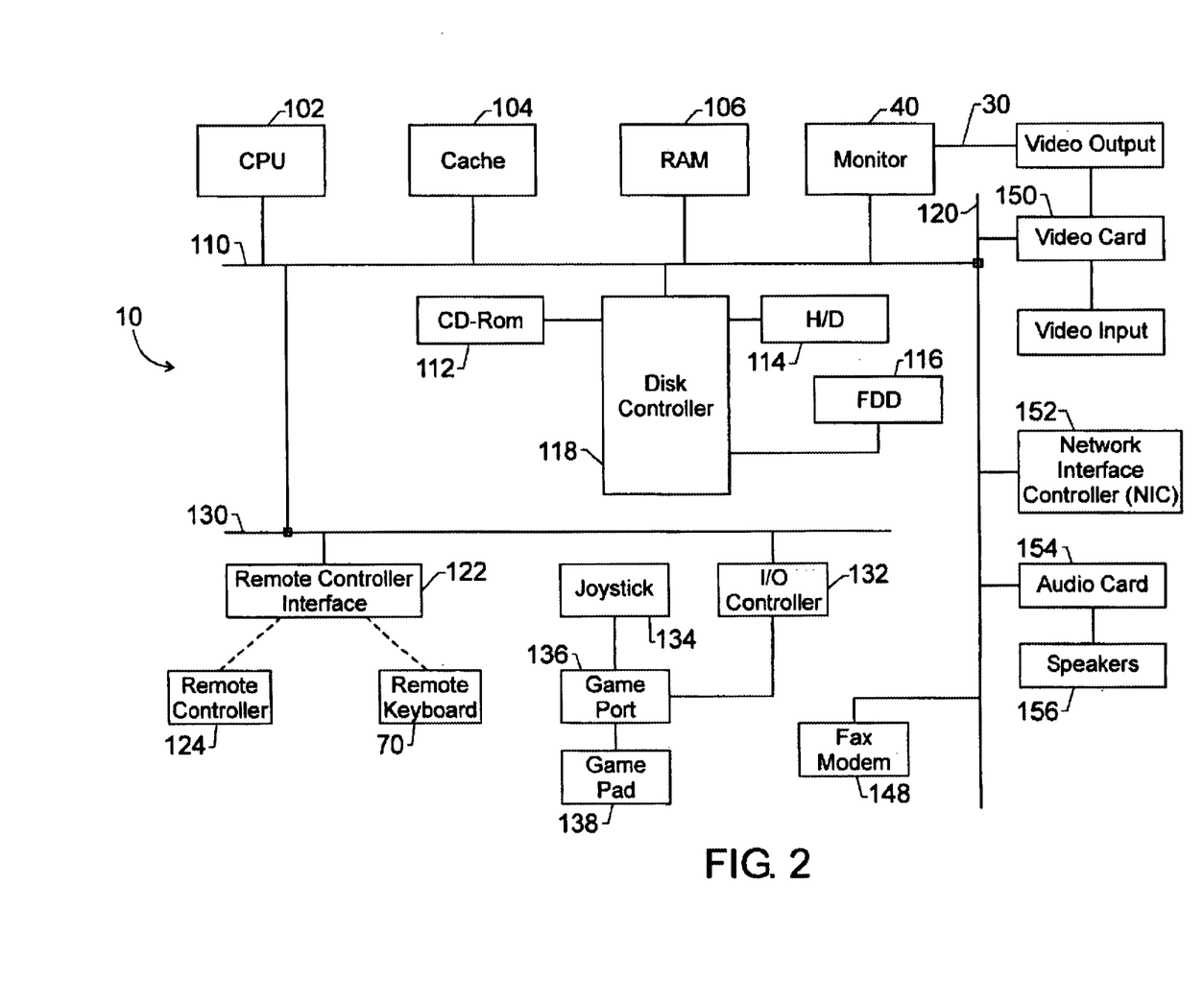
FIG. 2 is a schematic diagram of the computer architecture of the home theater system of FIG. 1B.

Referring now to FIG. 2, a simplified block diagram of a computer system C is shown including a video card 150. A central processing unit 102 is coupled to a host bus 110. The central processing unit 102 may be a single microprocessor, such an Intel Corporation's 486 or Pentium, or a more complete CPU system including multiple microprocessors, a cache controller, external coprocessors, and other components, coupled to one another or to the host bus 110. The host bus 110 functions to interface the CPU 102 to the rest of the computer system C. The host bus 110 typically is located on a motherboard, but may be configured as any of a number of other subsystems, as known in the art.

Also coupled to the host bus 110 is a cache 104. The cache may be a write through, a write back, or multi-level cache system for storing commonly used or recently used data values. The cache generally consists of a high speed static RAM structure, addressable within the memory space of the CPU's address lines.

A main memory, typically comprising a dynamic RAM 106, is coupled to the host bus 110. The main memory provides relatively high speed data storage for instructions and data needed for the processor to perform its functions. Also included in many computer systems is a dedicated ROM (not shown) providing system BIOS and other firmware sets of instructions to the processor, on initial bootup and also thereafter.

Also coupled to the host bus 110 is a disc controller 118. The disc controller 118 typically has a number of IDE ports to couple external devices. The disc controller 118 may be coupled directly to the CPU 102 or to main memory 106, or may be a separate device on the host bus 110. The disc controller 118 provides a connection to the CD-ROM drive 112, a hard disk drive 114, a remote controller interface 122, an input/output controller 132, and a floppy disk drive 116. The CD-ROM drive 112 provides optical storage and data retrieval capabilities, and the hard drive 114 and floppy disc drive 116 provide magnetic storage device capabilities to the computer system C.

Also coupled to the host bus 110 are two extension buses. The first extension bus is a PCI bus 120, coupled to the host bus 110 via a PCI bridge. The PCI bus 120 is coupled to a plurality of additional devices, including the aforementioned video card 150, a network interface controller 152, an audio device or audio card 154, a fax modem 148, and in some embodiments an additional PCI bridge (not shown). The video card 150 typically includes a graphics processor and a video graphics adapter, and is coupled to a monitor 40 via a coaxial cable 30 or other computer connector. The audio device 154 generally is coupled to audio speakers 156 or other audio output device to provide an audio output.

A second extension bus 130 is coupled to the host bus 110, providing an extension for additional peripheral components. Although typically configured as an X-bus or an ISA bus, the extension bus 130 may alternately be configured as an EISA, a PCI bus, a microchannel bus, or any of a variety of other bus structures commonly used and known.

The remote controller interface 122, coupled to the second extension bus 130, provides infrared signal detection, and is optically and remotely coupled to a remote keyboard 70 and a remote controller 124. The remote keyboard 70 and remote controller 124 allow a human user or an external device to communicate data via the remote controller interface 122 to the computer system C, without a direct wired connection.

The input/output controller 132, also coupled to the second extension bus 130, provides connection between the extension bus 130 and a game port 136 coupled to a game pad 138 and a joy stick 134. Although these devices are shown coupled through the input/output controller 132 to the extension bus 130, it will be recognized that other configurations are possible; for example, the joy stick 134 may instead be coupled to an infrared device for communicating directly to the remote controller interface 122.

It will be recognized that additional devices may be coupled via IDE controllers and other connectors to the various buses, providing resources and buffering for external devices. The flexibility of the computer system C therefore is not restricted to the particular example shown in the figure.

Figure 3:
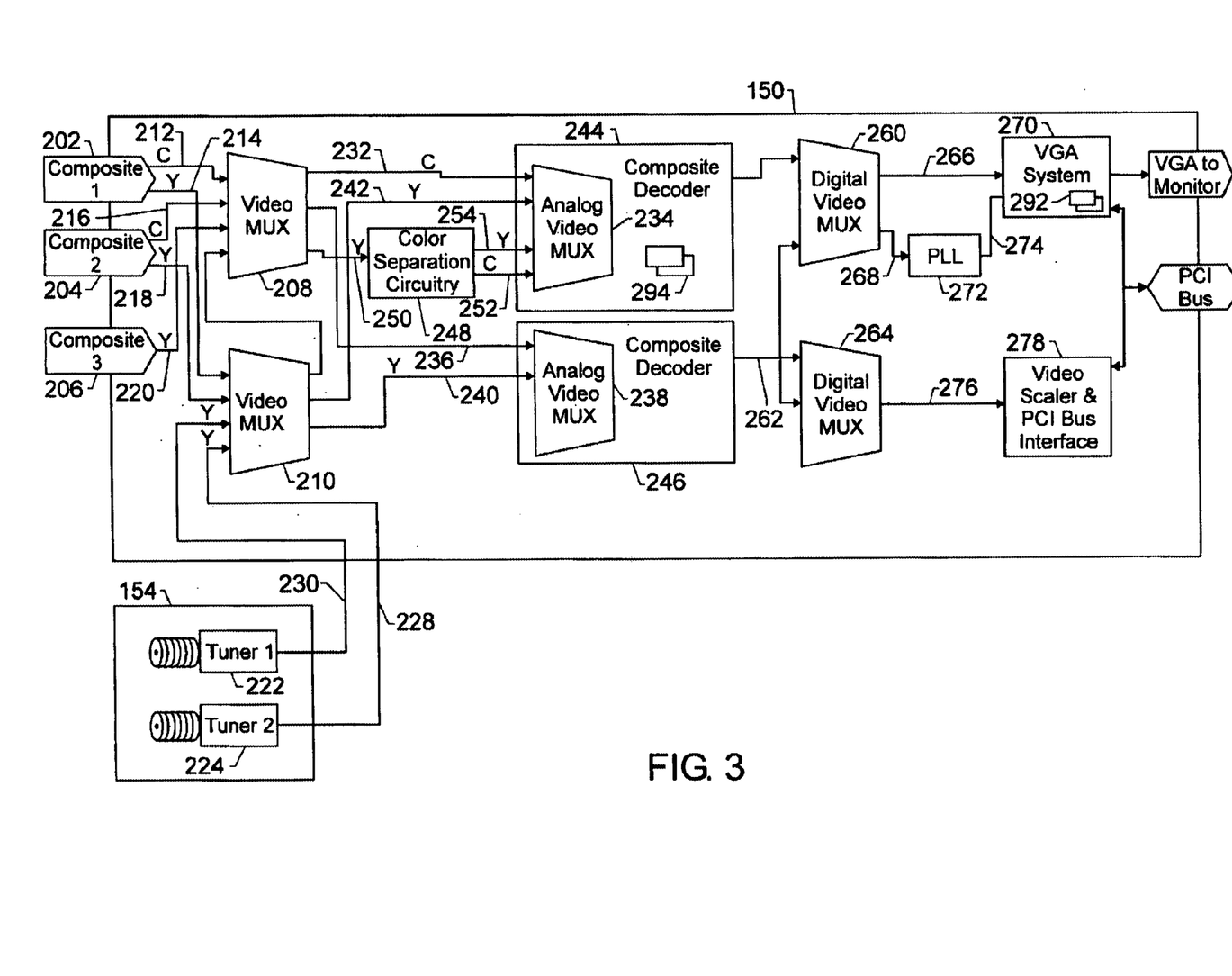
FIG. 3 is a schematic diagram of a video card of the home theater system of FIG. 2.

Turning to FIG. 3, a schematic diagram of the video card 150 of the home theater system of the present invention is shown. The inputs to the video card 150 include three composite video signals provided through Y/C video connectors, composite_1 202, composite_2 204, and composite_3 206. The constituent signals of the three input composite signals are provided to a pair of video multiplexers 208 and 210. The chrominance signal 212 from the composite_1 signal 202 is provided to video multiplexer 210, and the luminance signal 214 of the composite_1 signal 202 is provided to video multiplexer 210. The chrominance signal 216 of the composite_2 signal 204 is provided to video multiplexer 208, and the luminance signal 218 of the composite_2 signal is provided to video multiplexer 210. The composite_3 signal 206 includes a luminance signal 220 which is provided to video multiplexer 208. Tuners 222 and 224 located on the audio card 154 of the computer system 10 also provide input luminance signals 228 and 230 to video multiplexer 210. Other devices that are provided on the audio card 154 are not shown as the audio card 154 is not critical to an understanding of the invention.

A signal, 232 outputted from video multiplexer 208 is provided to a primary analog video multiplexer 234. Video multiplexer 208 also provides a Y/C signal 236 to a secondary analog video multiplexer 238. Video multiplexer 210 provides two signals 240 and 242; one signal 242 is provided to the primary analog video multiplexer 234, and the other signal 240 is provided to the secondary analog video multiplexer 238. The analog video multiplexer 234 is integrated into a primary video composite decoder 244, and the secondary analog video multiplexer 238 is integrated into a secondary video composite decoder 246. The primary decoder 244 of the present invention may or may not include color separation circuitry.

Figure 10:
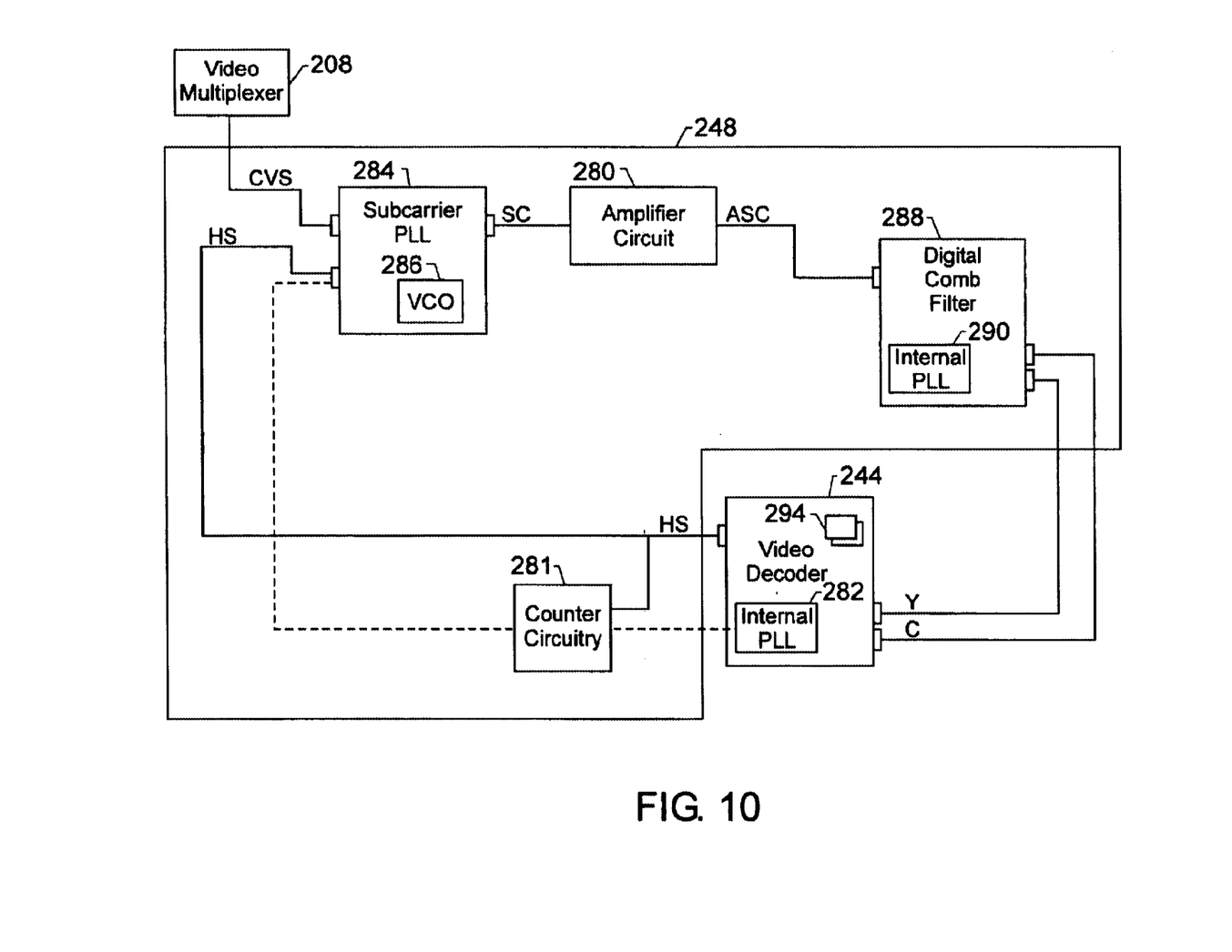
FIG. 10 is a schematic diagram of the color separation circuitry of the present invention and the video decoder of the video card of FIG. 3.

The video board 200 of the present invention includes color separation circuitry 248 external to the primary decoder 244. The color separation circuitry 248 receives a composite signal 250 as an input from video multiplexer 208 and outputs a chrominance signal 252 and a luminance signal, 254 to the primary analog video multiplexer 234 of the primary decoder 244 The color separation circuitry 248 includes a digital comb filter 288 (FIG. 10). Within the digital comb filter 288, video information is converted from analog to digital and back to analog. The decoded video signal 258 outputted by the primary video composite decoder 244 is provided to a digital video multiplexer 260. Similarly, the output video signal 262 of the secondary video composite decoder 246 is provided to a digital video multiplexer 264.

The primary digital video multiplexer 260 provides two outputs 266 and 268. One output 266 is provided directly to the VGA subsystem 270. The other output 268 is directed to a phase-locked-loop 272 (PLL). The PLL 272 supplies a clock signal 274 to the VGA subsystem 270. The VGA subsystem 270 has two memory areas; one area is used as an off-screen memory area for storing video information such as font information and data yet to be displayed. The other memory area is used to store data which is currently being displayed. The VGA subsystem 270 also includes a VGA controller. In displaying data, the VGA controller reads from the off-screen memory, scales the data if needed, performs color space conversion, and then sends the data through a digital-to-analog converter (DAC) to the display. In the secondary path, the secondary digital video multiplexer 264 provides a signal 276 to a video scaler and PCI bus interface 278. When data is sent over the secondary path, the data is downscaled if needed and then burst over the PCI bus 120 into the off-screen memory area of the video memory. The secondary path is typically used for picture-in-picture (PIP) functionality or pulling up web pages while watching television on the display 40 which are encoded in the vertical blanket interval (VBI).

Figure 4:
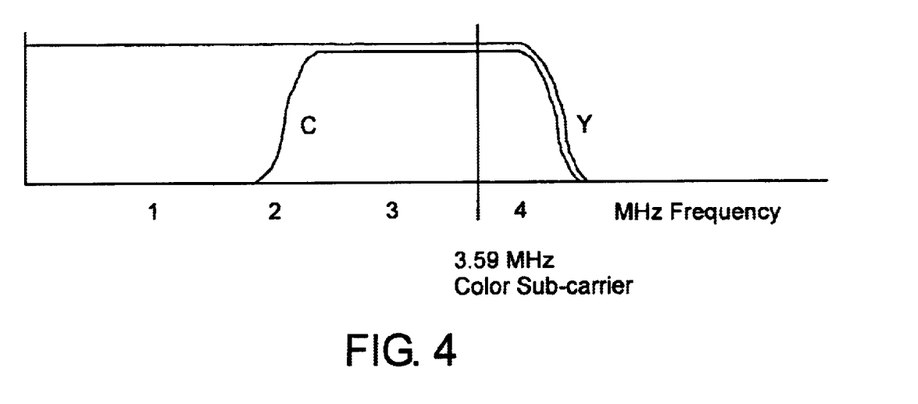
FIG. 4 is a frequency spectrum diagram of a composite video signal.

Turning to FIG. 4, the frequency spectrum diagram of a composite video signal is shown. The composite video signal includes a chrominance signal, C, and a luminance signal, Y. The chrominance and luminance signals have a portion of overlapping frequency range in order to minimize the bandwidth of the composite video signal. Also within the frequency range is a color subcarrier located at 3.58 MHz which provides a reference point for the chrominance information. In particular, a period of cycles of the color subcarrier form a color burst to be detected by a burst gate signal. When the color burst is detected, a PLL locks onto the frequency of the color subcarrier.

In order to process the color information of the composite video signal, a digital comb filter having a phase-locked-loop has been integrated into a contemporary video decoder to phase-lock the color subcarrier. Preferably, four times the frequency of the color subcarrier signal is provided as an input to a digital comb filter to allow for Y/C separation. In order to phase-lock the color subcarrier, a burst gate signal is needed to detect the color burst. A burst gate signal gated to a composite video signal informs a phase-locked-loop when to scan the composite video signal to detect the color burst. The contemporary approach to detecting the color burst has been to use a burst gate signal generated by circuitry within a video decoder to detect the color burst.

Contrastingly, the present invention uses color separation circuitry 248 external to a video decoder 244 for enhancing video quality beyond the performance of internal color separation circuitry In the present invention, a programmable horizontal sync pulse HS of the video decoder 244 is used to simulate a burst gate signal. The horizontal sync pulse HS is programmed to envelop the color burst, thereby simulating a burst gate signal. The horizontal sync pulse HS is provided to color separation circuitry 248 external to the decoder 244. The color separation circuitry 248 uses the programmable horizontal sync pulse HS -to phase-lock the color burst. The circuitry 248 then uses the phase-locked subcarrier times four, which is a reference for the chrominance signal of the composite video signal, to perform Y/C separation. Thus, a simulated burst gate signal allows for use of color separation circuitry 248 external to a video decoder 244.

The horizontal sync signal, which is part of the composite video signal, is used by each video device receiving the composite video signal to determine the horizontal synchronization of the video signal. At the video decoder, the horizontal sync signal takes the form of a programmable horizontal sync pulse HS. In conventional decoders, the standard synchronization position for the horizontal sync signal is defined by video standards such as ITU and BTU system M (NTSC) such that the horizontal sync signal precedes the color burst.

Figure 5:
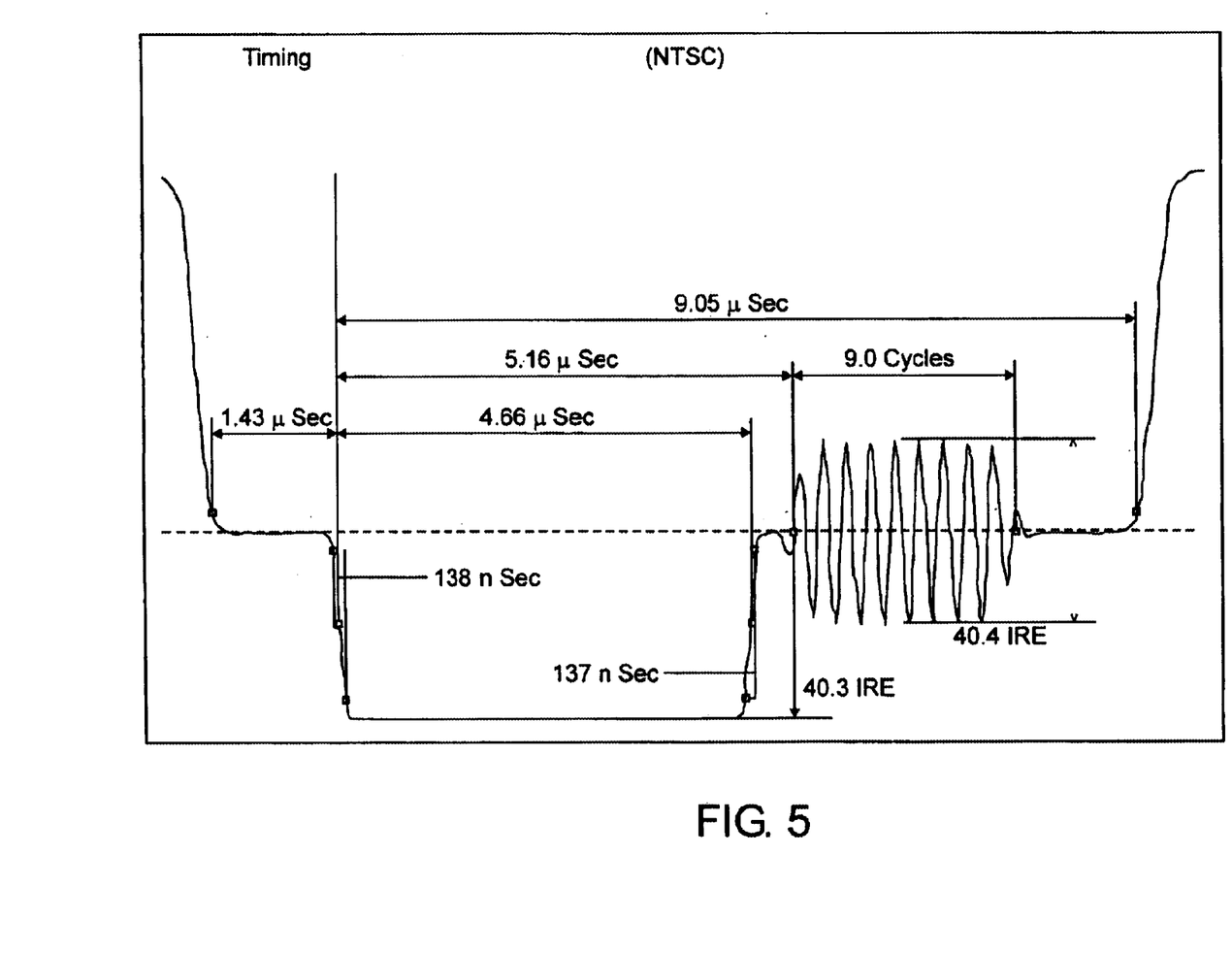
FIG. 5 is an NTSC composite video signal waveform with a color burst.

Turning to FIG. 5, an NTSC composite video signal waveform with a color burst is shown. Pursuant to the NTSC standard, various timing parameters for a typical composite video signal are shown. These timing parameters include pulse widths, pulse heights, rise times, fall times, and the position and number of cycles of the color burst. The time interval between the end of the vertical sync pulse and the beginning of the horizontal sync pulse is 1.3 microseconds. The rise time of the horizontal sync pulse is 130 nanoseconds, and the fall time of the horizontal sync pulse is 137 nanoseconds. The timing interval between the rising edge and the falling edge of the horizontal edge is 4.66 microseconds. The height of the horizontal sync signal is 40.3 IRE. The color burst begins 5.16 microseconds after the rise time of the horizontal sync signal. The NTSC color burst consists of nine cycles of the color subcarrier. The maximum height of the color burst is 40.4 IRE. The color burst signal ends 9.05 microseconds after the rising edge of the horizontal sync signal.

Figure 6:
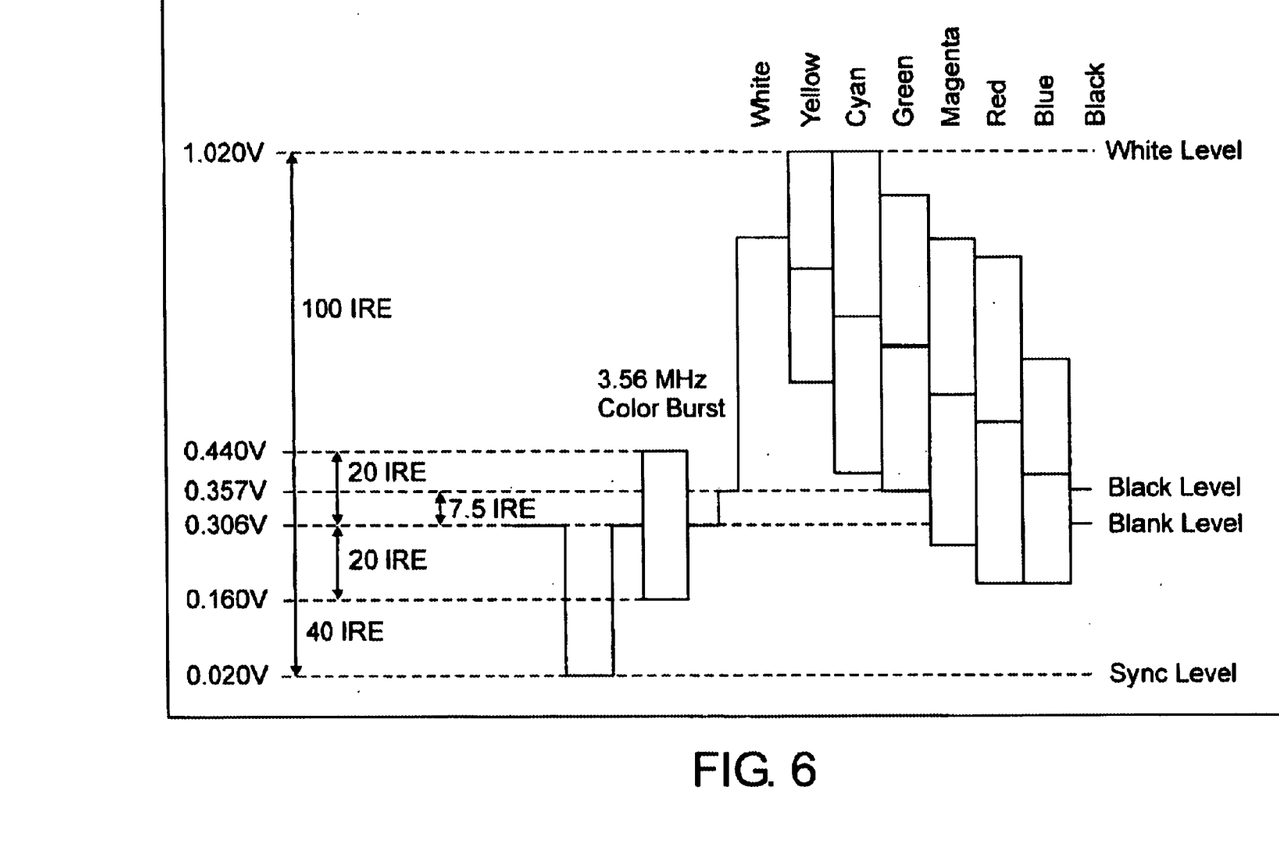
FIG. 6 is a detailed NTSC composite video signal waveform with a color burst showing a portion of the active video region of the composite video signal.

Turning to FIG. 6, a typical detailed NTSC composite video signal waveform with a color burst and part of the active video region is shown. The color burst has a frequency of 3.56 MHz. The top of the color burst pulse lies at +20 IRE, and the bottom of the color burst pulse lies at −20 IRE. The voltage level at the top of the color burst pulse is 0.440 volts, and the voltage at the bottom of the color burst pulse is 0.160 volts. The top of the horizontal sync pulse lies at 0.306 volts, and the bottom of the pulse lies at 0.020 volts. Pursuant to the NTSC standard, there is a 60 IRE difference between the sync level and the blank level. There is also a 7.5 IRE difference between the blank level and the black level for a composite video signal. The blank level of the composite video signal defines the vertical axis for the color burst and the horizontal sync signal. The white level for the composite video signal lies 100 IRE away from the blank level. Following the color burst is the active video region including a chrominance signal of the composite video signal. The chrominance signal carries information for various colors, as shown, white, yellow, cyan, green, magenta, red, blue, and black.

Figure 7:
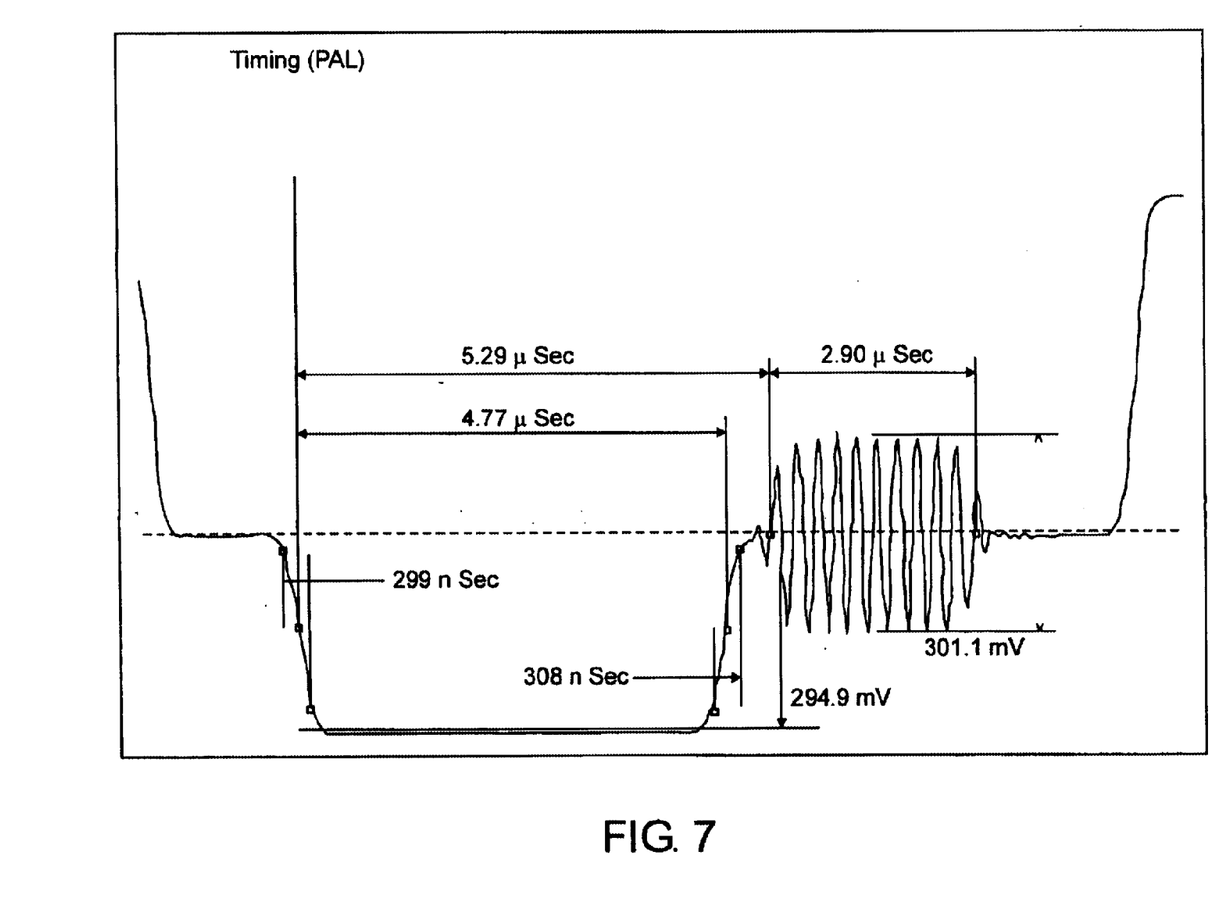
FIG. 7 is a PAL composite video signal waveform with a color burst.

Turning to FIG. 7, a PAL composite video signal waveform with a color burst is shown. Pursuant to the PAL standard, various timing parameters for a typical composite video signal are defined. The rise time of the horizontal sync pulse is 299 nanoseconds, and the fall time of the horizontal sync pulse is 308 nanoseconds. The timing interval between the rising edge and the falling edge of the horizontal edge is 4.77 microseconds. The height of the horizontal sync pulse is 294.9 millivolts. The color burst begins 5.29 microseconds after the rise time of the horizontal sync signal. The PAL color burst consists of ten cycles of the color subcarrier, and the maximum amplitude of the color burst is 301.1 millivolts.

Figure 8:
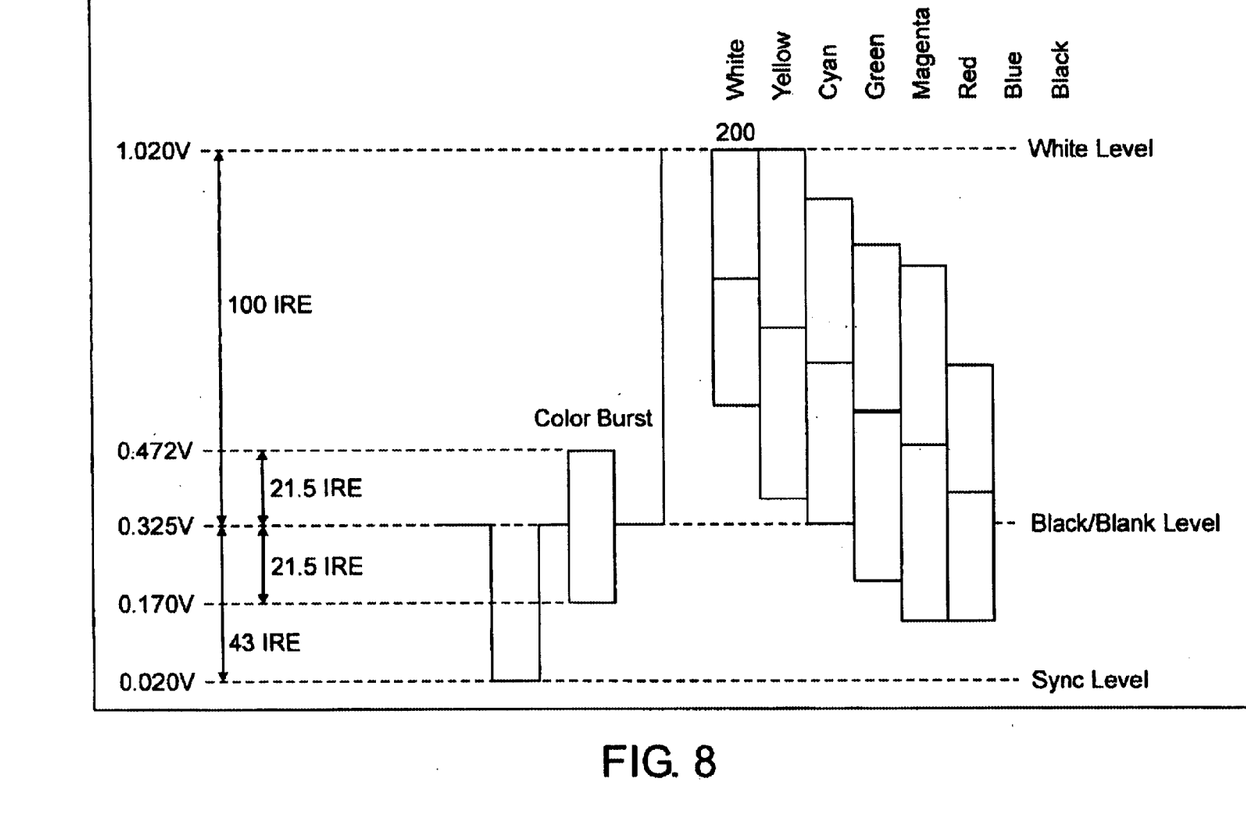
FIG. 8 is a detailed PAL composite video signal waveform with a color burst showing a portion of the active video region of the composite video signal.

Turning to FIG. 8, the color burst region and part of the active video region of a typical detailed PAL composite video signal waveform is shown. The top of the color burst pulse lies at +21.5 IRE, and the bottom of the color burst pulse lies at −21.5 IRE. The voltage level at the top of the color burst pulse is 0.472 volts, and the voltage at the bottom of the color burst pulse is 0.170 volts. The top of the horizontal sync signal lies at 0.325 volts, and the bottom of the pulse lies at 0.020 volts. Pursuant to the PAL standard, there is a 64.5 IRE difference between the sync level and the blank level. In the PAL system, the black level and blank level are one in the same. Another difference between the PAL standard and the NTSC standard is that the top of the white portion of the chrominance signal in the PAL system lies on the white level of the composite video signal. The PAL sync level lies at 0.020 volts, and the PAL blank level lies at 0.325 volts. Following the color burst is the active video region which includes the chrominance signal of a composite video signal. The chrominance signal carries information from various colors, namely, white, yellow, cyan, green, magenta, red, blue, and black.

Figure 9:
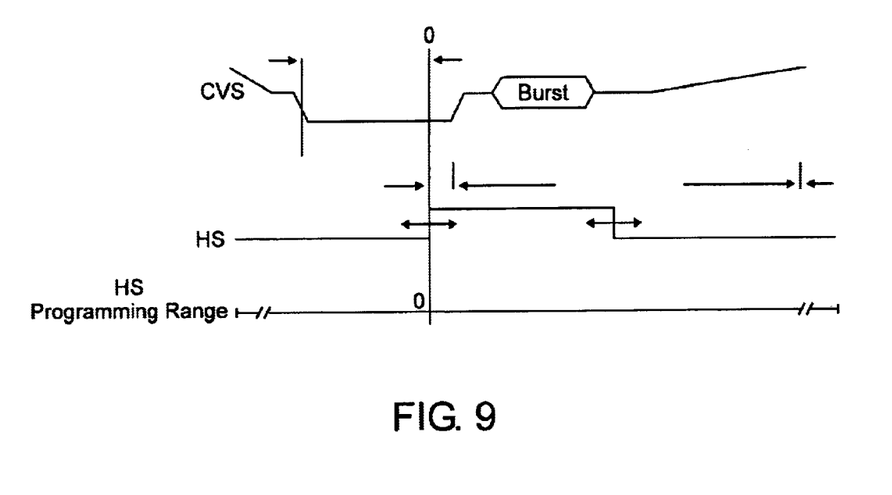
FIG. 9 is a timing diagram showing the programmable horizontal sync pulse of the video decoder of FIG. 3 and a composite video signal.

Turning to FIG. 9, a timing diagram of a composite video signal and the programmable horizontal sync pulse HS of the video decoder 244 of the present invention is shown. The vertical line designated as 0 represents a fixed offset or delay from the falling edge of the composite video signal. Location of the fixed offset, however, varies with each decoder. The frequency of the horizontal sync pulse HS depends on the video standard used. In the present invention, the horizontal sync pulse HS may be programmed to enclose the color burst, thereby serving as a simulated burst gate signal. For a particular decoder, there is a preferred location and width of the horizontal sync pulse HS to be programmed to best enclose the color burst. The horizontal sync pulse HS is programmable through registers 294 in the video decoder 244 which allow for setting the horizontal sync pulse HS to start and stop relative to a fixed edge of a timing signal of the decoder 244. The extent to which the horizontal sync pulse HS may be used to lock onto the color burst is dependent upon the width and the location of the pulse HS. The simulated burst gate signal is preferably not so far back in timing as to intersect the sync region and not so far forward in timing as to intersect the active video region. The horizontal sync pulse HS is asserted at a suitable timing location prior to the color burst and deasserted at a suitable timing location after the color burst. Also, given the current parameters of the color burst, the width of the pulse HS is preferably shrunk to sufficiently envelop the color burst. Programmability of the horizontal sync pulse HS thus permits the horizontal sync pulse HS to be varied to accommodate the sensitivity of the simulated burst gate signal.

The horizontal sync pulse HS is suited for simulating a burst gate signal since a horizontal sync changes every line. Since a burst gate signal is needed for every line, the horizontal sync is sufficiently frequent to simulate a burst gate signal. Contrastingly, a vertical sync does not change every video line and therefore is not sufficiently frequent to simulate a burst gate signal. Because the horizontal sync pulse HS of the decoder 244 has a fixed timing relation to the falling edge of a composite video signal, the horizontal sync pulse HS may also be programmed to define a timing envelope for a video signal, thereby serving as a synchronization key for various video devices.

The programmable horizontal sync pulse HS may also be used to generate a simulated burst signal while maintaining the traditional location of the pulse. By using counter circuitry 281 external to the video decoder 244 to count the pixel clock cycles from the horizontal sync pulse HS to the time at which the color burst begins, the color burst is detected while the traditional location of the horizontal sync pulse HS is maintained. In counting the pixel clock 282 cycles following the horizontal sync pulse HS, either the falling edge or the rising edge of the horizontal sync pulse HS may be used. When the color burst is detected, the counter circuitry 281 asserts a simulated burst gate signal. After a certain number of pixel clock 282 cycles depending on the width of the color burst, the counter circuitry 281 deasserts the simulated burst gate signal. The counter circuitry 281 may be coupled to the horizontal sync pulse HS, the pixel clock 282 of the video decoder 244, and the pin of the subcarrier PLL 284 for receiving a burst gate signal (FIG. 10).

Turning to FIG. 10, an embodiment of the color separation circuitry 248 of the present invention is shown. The color separation circuitry 248 may or may not include an amplifier or buffer circuit 280. In the embodiment shown, the programmable horizontal sync pulse HS of the decoder 244 is provided to a subcarrier PLL 284 through a pin for receiving a burst gate signal. When the composite video signal CVS and the simulated burst gate signal HS are provided, the PLL 284 phase-locks a voltage controlled oscillator (VCO) 286 of the PLL 284 to the color burst. The subcarrier output signal SC of the PLL 284 has a frequency of the color burst or a multiple thereof The subcarrier PLL receives the composite video signal CVS from the video multiplexer 208. The subcarrier output signal SC from the subcarrier PLL 284 is provided to the amplifier circuit 280 which steps up the voltage levels of the subcarrier signal SC outputted by the subcarrier PLL 284 producing an amplified subcarrier signal ASC. An amplifier circuit is preferably provided in the color separation circuitry 248 when the voltage of the subcarrier PLL clock output SC is too low to constitute a digital input for the digital comb filter 288 to receive the subcarrier signal. For instance, where the output voltage of the subcarrier PLL signal SC is on the order of a few hundred millivolts, the amplifier circuit 280 is used to step up the voltage from a millivolt range to a volt range. However, where a subcarrier PLL signal SC has a voltage that is already on the order of volts rather than millivolts, the amplifier circuit 280 is not needed. The output voltage signal ASC of the amplifier circuit is provided to the digital comb filter 288 at a pin for receiving the subcarrier signal.

Embodiments of the present invention may or may not include a subcarrier PLL 284 external to the digital comb filter 288. Whether an external subcarrier PLL 284 is needed depends on the functionality of the PLL 290 internal to the digital comb filter 288. The PLL of some digital comb filters are not designed to process a subcarrier signal. Digital comb filters having PLLs capable of processing a subcarrier signal may require a burst gate signal but not require an external PLL. For digital comb filters having PLLs unable to process a subcarrier signal, the functionality to process a subcarrier signal may be added to the internal PLL or a PLL external to the comb filter may be used. However, since incorporating the functionality of a subcarrier PLL into a digital comb filter requires implementation at the application specific integrated circuit (ASIC) level, the preferred embodiment is an external subcarrier PLL 284.

In detecting the color burst, the horizontal sync pulse HS is programmed to fetch the color burst of the next video line. Also, since the horizontal sync pulse HS locks onto the composite video signal CVS and propagates through the subcarrier PLL 284 and the digital comb filter 288, the horizontal sync pulse HS of the decoder 244 does not detect the color burst for a couple of lines. Therefore, it takes a couple of video lines before the subcarrier PLL 284 locks onto the subcarrier frequency. Since the comb generated by the digital comb filter 284 is only affected for one field time and a composite video signal CVS is continuous, the lack of a locked subcarrier for one field time is unnoticeable provided a weak video signal was not inputted.

Since the horizontal sync signal passes downstream from the decoder 244 to the VGA subsystem 270, programming the horizontal sync pulse signal HS to simulate a burst gate signal by changing the timing position of the pulse affects or alters the determination by the VGA subsystem 270 of when there are active pixels from the video decoder 244. Whether programming the horizontal sync pulse HS to simulate a burst gate signal significantly impacts that determination depends on the frequency at which the composite video signal CVS is being scanned. If data is being over-scanned at a frequency such as the frequency used for a full screen of video data, the offset due to programming the horizontal sync pulse HS to simulate a burst gate signal is unnoticeable. If, however, data is being under-scanned at a frequency such as the frequency used for a PIP, registers 292 in the VGA subsystem 270 are preferably programmed to offset from the horizontal sync pulse HS when the sync pulse HS is used to generate a simulated burst gate signal. Compensation may also be achieved using registers external to the subsystem 270. Thus, the change in timing to the horizontal sync pulse HS due to simulating a burst gate signal is compensated downstream. A change in timing to the horizontal sync pulse HS due to generating a timing envelope for synchronizing video devices is compensated in this way as well.

In addition to a home theater system, the present invention extends to other appliances that use composite video signals. Further, although the simulated burst gate signal of the present invention is described as provided to color separation circuitry, the simulated burst gate signal of the present invention may also be provided to other video circuitry.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An appliance using a composite video signal having a color burst, the composite video signal including a luminance signal and a chrominance signal, comprising:
   a video decoder for decoding the luminance signal and the chrominance signal, the chrominance signal including a color burst, the video decoder providing a programmable decoded horizontal sync pulse, the video decoder having a pixel clock; and
   counter circuitry externally coupled to said video decoder for generating and providing a simulated external burst gate signal by counting cycles of the pixel clock after the programmable decoded horizontal sync pulse,
   wherein the simulated external burst gate signal is asserted at a first suitable timing location prior to the color burst and the simulated external burst gate signal is deasserted at a second suitable timing location after the color burst, and
   wherein the simulated external burst gate signal provides a suitable width to effectively lock onto the color burst.

2. The appliance of claim 1, further comprising:
   video circuitry external to the video decoder receiving the simulated external burst gate signal.

3. The appliance of claim 1, further comprising:
   a filter coupled to said video decoder for separating the composite video signal into a luminance signal and a chrominance signal.

4. The appliance of claim 3, wherein said filter is external to said video decoder.

5. The appliance of claim 1, further comprising:
   a subcarrier phase-locked-loop coupled to said video decoder for phase-locking the color burst.

6. The appliance of claim 5, further comprising:
   a filter coupled to said video decoder for separating the composite signal into a luminance signal and a chrominance signal.

7. The appliance of claim 6, wherein said subcarrier phase-locked loop is external to said filter.

8. The appliance of claim 6, wherein said subcarrier phase-locked loop is integrated with said filter.

9. The appliance of claim 6, said phase-locked-loop providing a phase-locked subcarrier signal, further comprising:
   a buffer coupled between said subcarrier phase-locked-loop and scud filter for amplifying the voltage of the phase-locked subcarrier signal.

10. The appliance of claim 1, the video decoder providing active pixels; further comprising:
a video device receiving the simulated external burst gate signal and defining an offset of the programmable decoded horizontal sync pulse for determining when active pixels are provided by the video decoder.

11. The appliance of claim 10, wherein said video device comprises registers for defining an offset of the programmable decoded horizontal sync pulse.

12. The appliance of claim 1, wherein the appliance is a home theater system.

13. The appliance of claim 12, wherein the appliance comprises a computer system.

14. The appliance of claim 1, wherein the appliance is a computer system.

15. The appliance of claim 1, wherein said video decoder comprises registers for programming the programmable decoded horizontal sync pulse.

16. An appliance using a composite video signal having a color burst, comprising:
a detection means for detecting a programmable decoded horizontal sync pulse of a video decoder;
a count means external to the video decoder for counting pixel clock cycles of the video decoder after the programmable decoded horizontal sync pulse; and
a generation means external to the video decoder for generating a simulated external burst gate signal based on the number of counted pixel clock cycles,
wherein the simulated external burst gate signal is asserted at a first suitable timing location prior to the color burst and the simulated external burst gate signal is deasserted at a second suitable timing location after the color burst, and
wherein the simulated external burst gate signal provides a suitable width to effectively lock onto the color burst.

17. The appliance of claim 16, wherein the appliance is a home theater system.

18. The appliance of claim 17, where the appliance comprises a computer system.

19. The appliance of claim 16, wherein the appliance is a computer system.

20. A method of detecting a color burst of a composite video signal using counter circuitry external to a video decoder having a programmable decoded horizontal sync pulse and a pixel clock, comprising the steps of:
detecting the programmable decoded horizontal sync pulse;
tracking the cycles of the pixel clock after the programmable decoded horizontal sync pulse; and
generating a simulated external burst gate signal when the number of pixel clock cycles corresponds to a set of predetermined numbers of pixel clock cycles,
wherein the simulated external burst gate signal is asserted at a first suitable timing location prior to the color burst and the simulated external burst gate signal is deasserted at a second suitable timing location after the color burst, and
wherein the simulated external burst gate signal provides a suitable width to effectively lock onto the color burst.

21. The method of claim 20, wherein the step of tracking the cycles of the pixel clock includes the step of counting the cycles of the pixel clock after the rising edge of the programmable decoded horizontal sync pulse.

22. The method of claim 20, wherein the step of tracking the cycles of the pixel clock includes the step of counting the cycles of the pixel clock after the falling edge of the programmable decoded horizontal sync pulse.

23. The method of claim 20, wherein the step of generating a simulated external burst gate signal includes the step of generating the rising edge of the simulated external burst gate signal when the number of pixel clock cycles corresponds to a predetermined number of pixel clock cycles.

24. The method of claim 20, wherein the step of generating a simulated external burst gate signal includes the step of generating the falling edge of the simulated external burst gate signal when the number of pixel clock cycles corresponds to a predetermined number of pixel clock cycles.

* * * * *